United States Patent [19]

Leoncavallo et al.

[11] Patent Number: 4,894,155
[45] Date of Patent: Jan. 16, 1990

[54] SINGLE MEMBRANE DISC SUPPORTING UPPER AND LOWER MEMBRANES

[75] Inventors: Richard A. Leoncavallo, Pittsford; Gregory R. Phillips, Penfield, both of N.Y.

[73] Assignee: Nalge Cmpany, Rochester, N.Y.

[21] Appl. No.: 181,417

[22] Filed: Apr. 14, 1988

[51] Int. Cl.⁴ .............................................. B01D 13/00
[52] U.S. Cl. ................................ 210/321.84; 210/486
[58] Field of Search ............... 210/314, 316, 346, 486, 210/487, 321.84, 321.75

[56] References Cited

U.S. PATENT DOCUMENTS

| | | | |
|---|---|---|---|
| 3,037,633 | 6/1962 | Veitel | 210/232 |
| 3,064,817 | 11/1962 | van der Werff | 210/232 |
| 3,141,845 | 7/1964 | Nadherny | 210/237 |
| 3,142,642 | 7/1964 | Kracklauer | 210/232 |
| 3,283,906 | 11/1966 | Crane | 210/232 |
| 3,294,241 | 12/1966 | Sicard et al. | 210/232 |
| 3,334,750 | 8/1967 | Ullman, Jr. | 210/486 |
| 3,389,802 | 6/1968 | Stobe | 210/232 |
| 3,398,834 | 8/1968 | Nuttall et al. | 210/346 |
| 3,471,022 | 10/1969 | Conrad | 210/346 |
| 3,477,582 | 11/1969 | Baldwin | 210/232 |
| 3,537,592 | 11/1970 | Ogden | 210/486 |
| 3,568,842 | 3/1971 | Bozek | 210/307 |
| 3,809,246 | 5/1974 | Niogret | 210/232 |
| 3,979,297 | 9/1976 | Bardin | 210/232 |
| 3,979,298 | 9/1976 | Breysse | 210/232 |
| 3,984,324 | 10/1976 | Wang | 210/232 |
| 4,071,444 | 1/1978 | Ash et al. | 210/22 A |
| 4,234,428 | 11/1980 | Schnell | 210/346 |
| 4,501,663 | 2/1985 | Merrill | 210/347 |
| 4,601,824 | 7/1986 | Dreyer | 210/232 |
| 4,689,148 | 8/1987 | Timm et al. | 210/321.1 |

Primary Examiner—Richard V. Fisher
Assistant Examiner—Wanda L. Millard
Attorney, Agent, or Firm—Marjama & Pincelli

[57] ABSTRACT

A filter assembly having a filter chamber. Filter means is disposed in the filter chamber which comprises at least one disc shaped filter assembly. The disc assembly has an upper support disc and a lower aligning support disc. A filter membrane is disposed on the top side of the support disc which has a plurality of primary grooves for receiving a liquid filter through the filter membrane. The aligning support disc fits substantially centrally on the bottom surface of the support disc and is provided with radially extending ribs which form radially extending grooves between. A second filter membrane is placed on the bottom surface of the support disc and overlaps a portion of the aligning disc. The bottom surface of the support disc is also provided with grooves for collection of a filtrate. Axial extending grooves are provided in the support disc for connecting the collection on the top surface with the bottom surface. The filtrate flows through the grooves between the support disc and aligning support disc to the outlet of the filter assembly.

8 Claims, 6 Drawing Sheets

SINGLE MEMBRANE DISC SUPPORTING UPPER AND LOWER MEMBRANES

BACKGROUND OF THE INVENTION

This invention relates to filtration and more particularly to a disposable filter assembly.

In order to obtain large flow through filters with relatively fine pores, for example, below 1 micron, filtered membranes having relatively large areas are necessary. Typically, such has been provided by using a number of small individual filters in parallel. Additionally, in the prior art, there has been suggested providing a filter unit having a plurality of stacked discs disposed therein, wherein a filter membrane is bonded to the upper and lower surface of each disc and passages are provided in the disc to a common central opening which is connected to the exhaust port. An example is illustrated in U.S. Pat. No. 4,501,663. In this patent, there is disclosed a two piece disc assembly used to support two membranes. Each half is relatively complex in structure each requiring a substantial amount of time to mold. This reference also discloses a single disc support structure which is relatively complex in configuration and requires relatively expensive mold to produce. Additionally, this structure requires the use of two different size membranes and is relatively inefficient with regard to the use of the membrane filters.

Applicant's have invented a filter assembly which is relatively inexpensive to manufacture, easy to assemble and provides for efficient use of filter membranes.

SUMMARY OF THE INVENTION

A filter assembly having a filter chamber. Filter means is disposed in the filter chamber which comprises at least one disc shaped filter assembly. The disc assembly has an upper support disc and a lower aligning support disc. A filter membrane is disposed on the top side of the support disc which has a plurality of primary grooves for receiving a liquid filter through the filter membrane. The aligning support disc fits substantially centrally on the bottom surface of the support disc and is provided with radially extending ribs which form radially extending grooves between. A second filter membrane is placed on the bottom surface of the support disc and overlaps a portion of the aligning disc. The bottom surface of the support disc is also provided with grooves for collection of a filtrate. Axial extending grooves are provided in the support disc for connecting the collection on the top surface with the bottom surface. The filtrate plows through the grooves between the support disc and aligning support disc to the outlet of the filter assembly.

DETAILED DESCRIPTION OF THE DRAWINGS

FIG. 7 is a top plan view of the spacer used with the support structure;

FIG. 9 is a bottom plan view of the spacer of FIG. 7; and

DETAILED DESCRIPTION OF THE INVENTION

Figure 1:
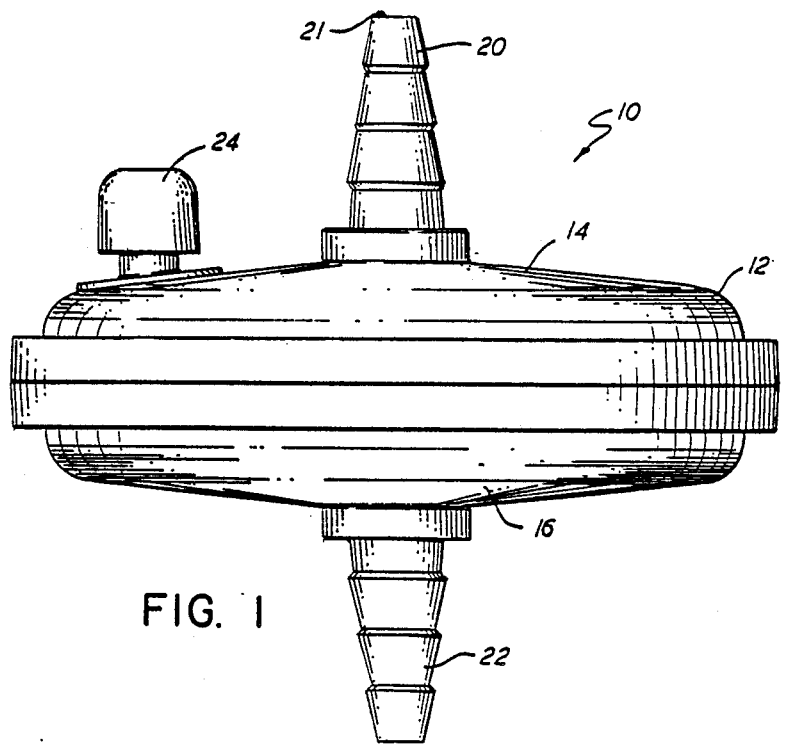
FIG. 1 is a side elevational view of a filter assembly made in accordance with the present invention.
Figure 2:
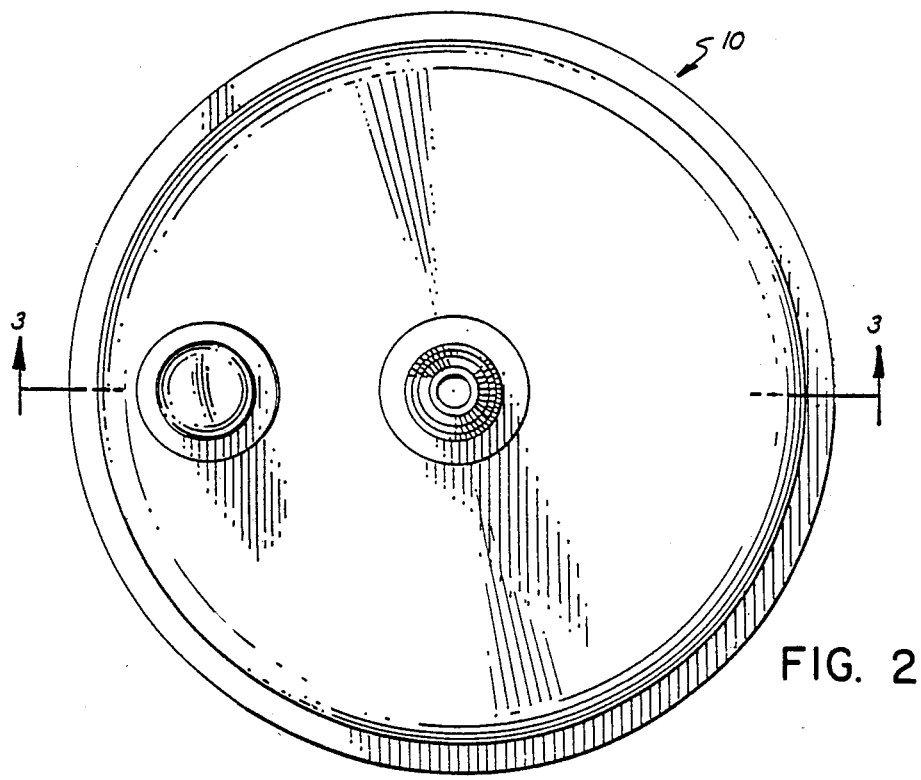
FIG. 2 is a top plan view of the filter assembly of FIG. 1.
Figure 3:
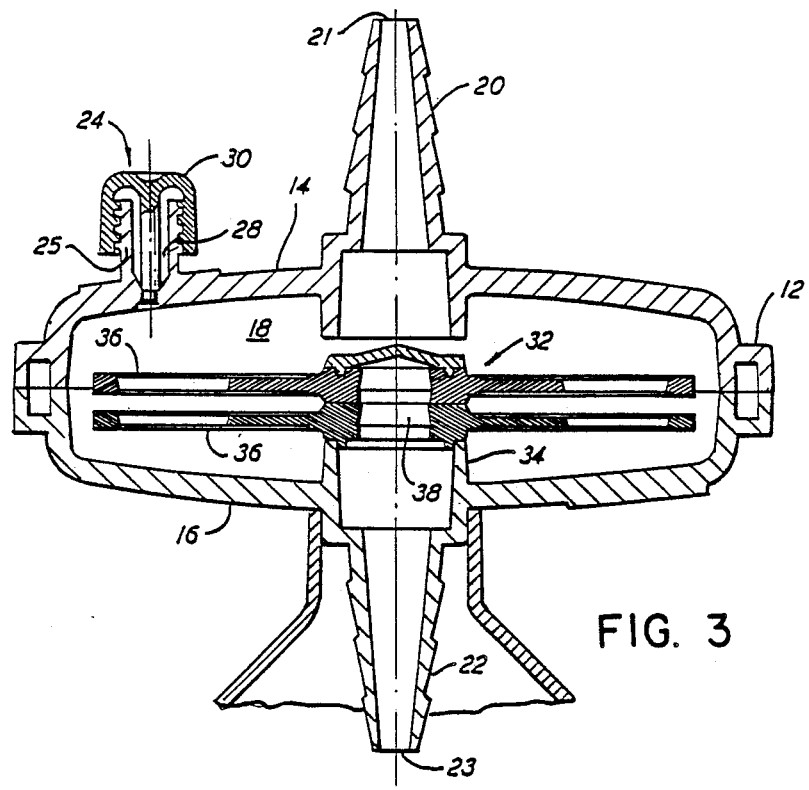
FIG. 3 is a cross sectional view taken along line 3—3 of FIG. 2.

Referring to FIGS. 1, 2 and 3, there is illustrated a filter assembly 10 made in accordance with the present invention. Filter assembly 10 comprises a housing 12 made out of an appropriate plastic. In the particular embodiment illustrated, the housing 12 is made of polycarbonate. Housing 12 comprises a molded upper section 14 and a molded lower section 16 which are welded together to form a sealed filtering chamber 18. The upper section 14 is provided with an inlet 20 for allowing liquid to be filtered to enter the filtering chamber 18 through opening 21. The lower section 16 has an outlet 22 for allowing exit of a filtrate that has been filtered within the filtering chamber 18 through opening 23. Preferably, inlet 20 and outlet 22 are integrally formed with upper section 14 and lower section 16, respectively, as illustrated. The upper section 14 is provided with vent means 24 for allowing removal of trapped air or gas within the filtering chamber 18. Vent means 24 may take a variety of configurations and in the particular embodiment illustrated, vent means 24 comprises a stem 25 which is integrally formed with the upper section 14 having a bore 28 which extends therethrough into filtering chamber 18. A cap 30 is provided for controlling the flow of trapped air out of the filtering chamber 18. The particular details of construction of vent means 24 may be found in co-pending U.S. patent application Ser. No. 181,416 which is hereby incorporated by reference. However, it is understood that any vent means may be provided or even eliminated if so desired.

Figure 5:
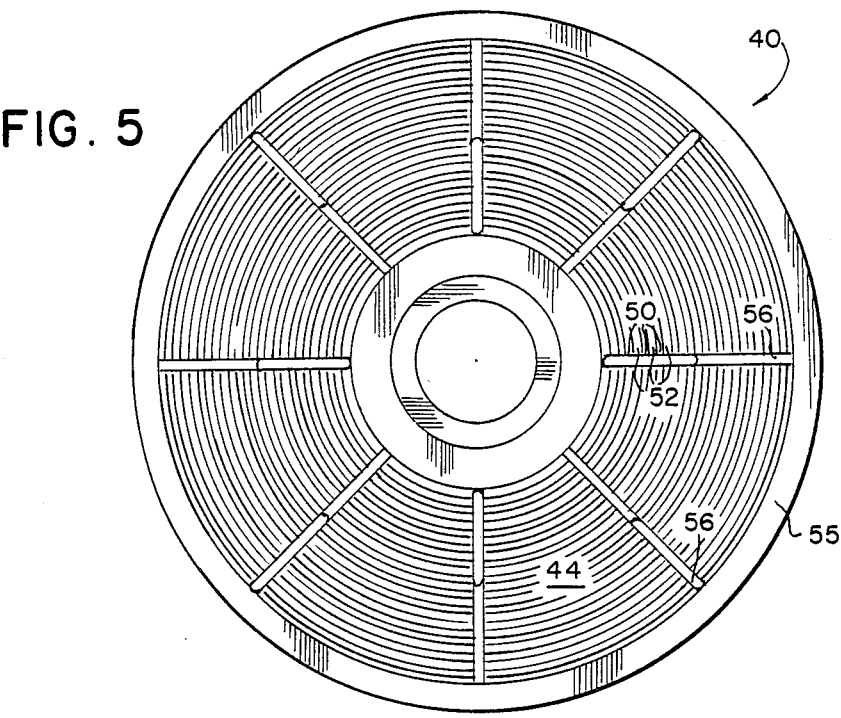
FIG. 5 is a top plan view of the disc support structure for supporting filter membrane of the filter assembly of the present invention with the membrane removed.

Referring to FIGS. 3 through 9, there is illustrated in further detail the structural features of the filter assembly 10. Disposed within the filtering chamber 18 is filtering means 32 for filtering a liquid entering through inlet 20 and allowing exit of the filtrate to outlet 22. Filtering means 32 is secured to a annular boss 34 integrally formed in lower section 16 which is in communication with outlet 22. The filter means 32 is preferably made out of a plastic material and is preferably welded to boss 34 to prevent any unfiltered liquid from exiting outlet 22. In the particular embodiment illustrated, filtering means 32 comprises at least one filter support assembly 36 having a central opening 38 for communication with outlet 22. The filter support assembly 36 comprises an annular membrane support disc 40 and an aligning spacer 42 for mating with the annular membrane support disc 40. The annular membrane support disc 40 has a top surface 43 and bottom surface 45. The top surface 43 has a membrane support surface 44 and a central portion 46 having an axial opening 48 which forms part of central opening 38 for communicating with outlet 22. The membrane support surface 44 has an inner annular land 47 which supports the inner periphery of a filter membrane 54 placed on top support surface 44 and a continuous outer annular land 55 for supporting the outer periphery of membrane 54. In FIG. 5, membrane 54 is removed to clearly illustrate top surface 43. Membrane 54 is secured continuously about its inner and outer peripheries to lands 47, 55, respectively, so as to provide a seal at the inner and outer peripheries. Preferably, membrane 54 is secured by welding the membrane 54 to lands 47, 55. The top membrane support surface 44 between lands 47 and 55 is provided with a plurality of circumferentially extending grooves 50 which form a plurality of ribs 52 therebetween which supports the central portion of filter membrane 54. The ribs 52 are preferably designed so as to provide minimal contact with the filter membrane 54 so as to provide as much surface area for filtering a liquid. Top surface 44 is further provided with a plurality of spaced radially extending collection grooves 56 for collecting the filtrate that has been filtered through the membrane 54 by grooves 50.

The central portion 46 of disc 40 is provided with a raised annular section 49 having a substantially flat mating surface 51. A recess 53 is provided in flat surface 51 for receiving a projection from an adjacent filter support assembly 36 or sealing cap 90 which is discussed later herein.

Figure 6:
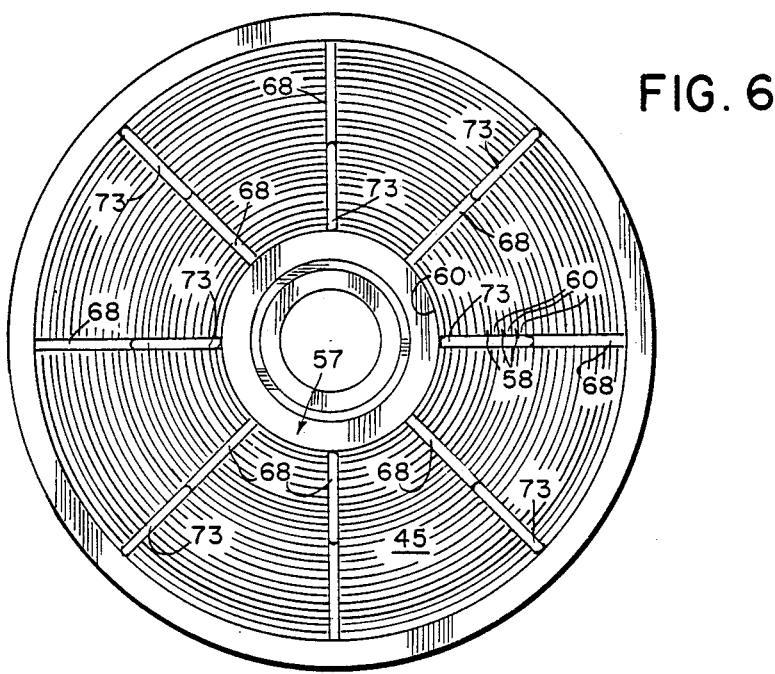
FIG. 6 is a bottom plan view of the disc support structure of FIG. 5 with the membrane removed.
Figure 10:
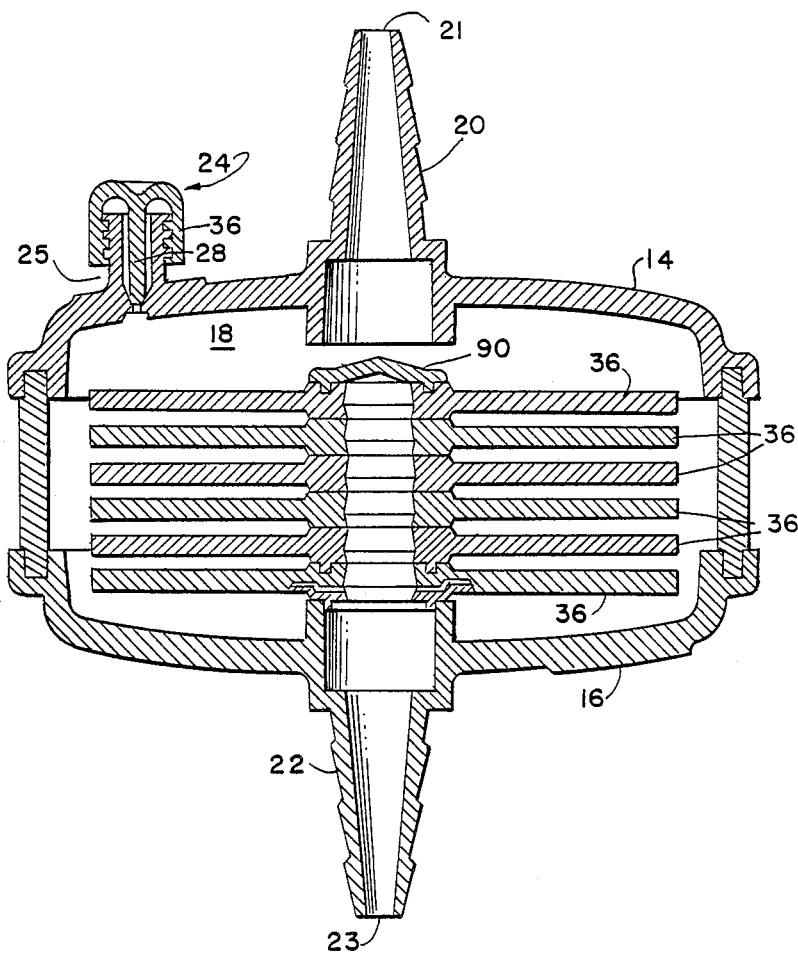
FIG. 10 is a cross sectional view of a modified embodiment of a filter assembly made in accordance with the present invention.

Bottom surface 45 is provided with a continuous outer annular land 61 dispose substantially opposite land 55, a central portion 59 disposed substantially opposite grooves 50 and an inner section 57 radially inward of central portion 59. Central portion 59 is provided with a plurality of circumferentially extending grooves 58 disposed radially inward of land 61 which form a plurality of membrane supporting ribs 60 which are designed for supporting a filter membrane 62 secured to bottom surface 45. In FIG. 6, membrane 62 is removed so as to clearly illustrate botton surface 45. The outer land 61 supports the outer periphery of filter membrane 62 which is preferably welded about the periphery to land 61.

A plurality of radial extending collection grooves 68 are provided for connecting the grooves 58 thereby collecting the filtrate that is received in each of the grooves 58. The radially outer portion of inner section 57 adjacent the radially inner most rib 60 in central section 59 has recess 65 which forms an annular inner shoulder 67 and annular outer shoulder 69. The top surface 70 of shoulder 69 preferably starts at the base 75 of grooves 58. The inner section 57 adjacent inner shoulder 67 is provided with a substantially flat mating surface 71. Mating surface 71 is raised above recess 65 a height H.

A plurality of axially extending grooves or slots 73 are preferably placed equidistant about the circumference of support disc 40 which connect collection grooves 56 with collection grooves 58. In the particular embodiment illustrated, there are eight grooves 73. Preferably, each groove 73 extends for about half of the length of radial collection grooves 56, 58 and alternate located in the radially inner half or radially outer half of grooves 56, 58 as illustrated.

Figure 8:
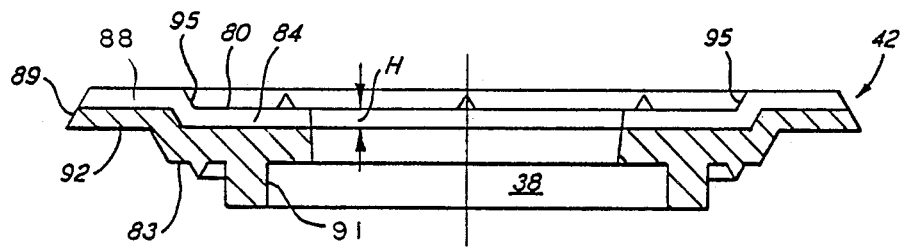
FIG. 8 is a cross sectional view of the spacer of FIG. 7 taken along line 7—7.
Figure 4:
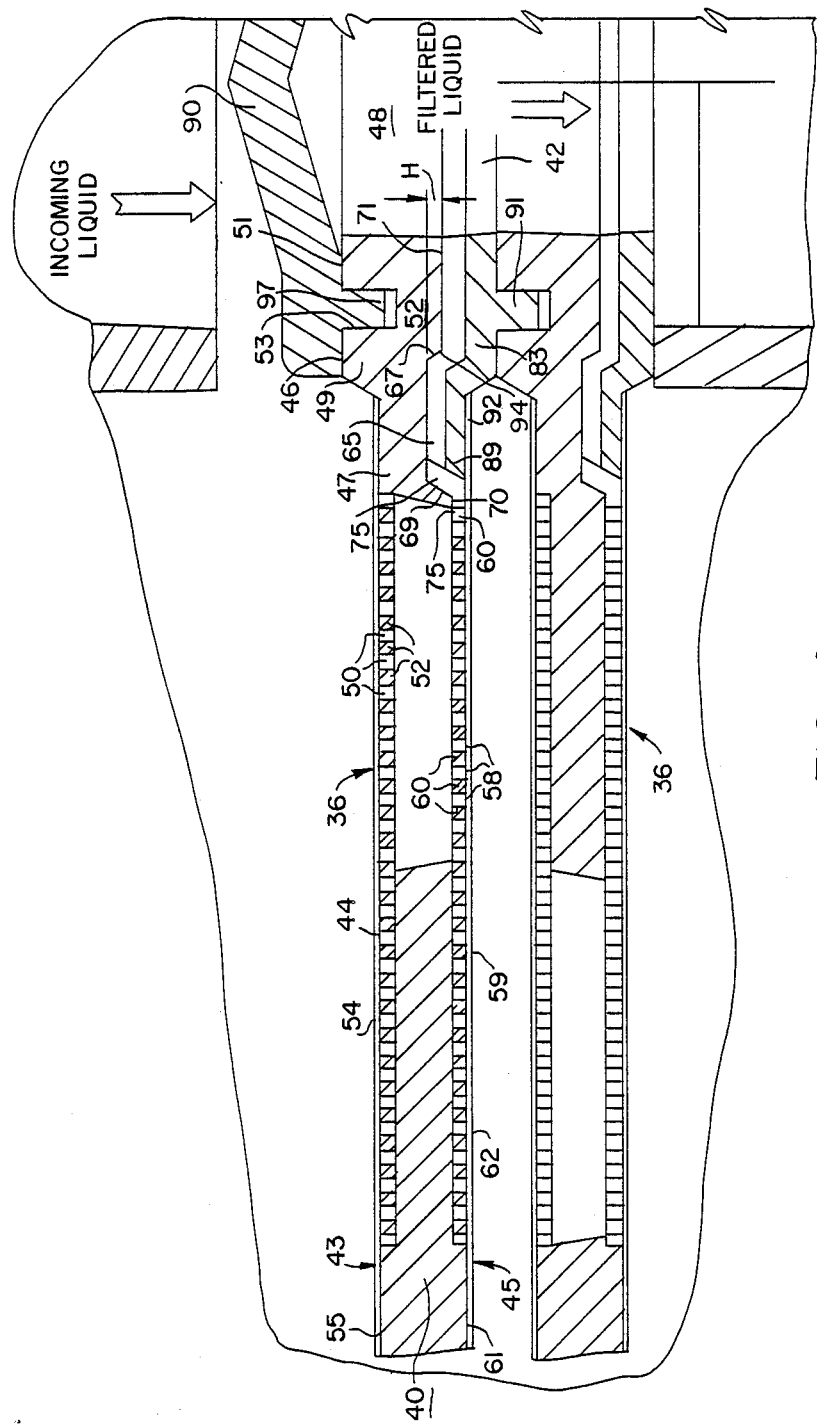
FIG. 4 is an enlarge partial sectional view of the filter assembly of FIG. 3.
Figures 7, 9:
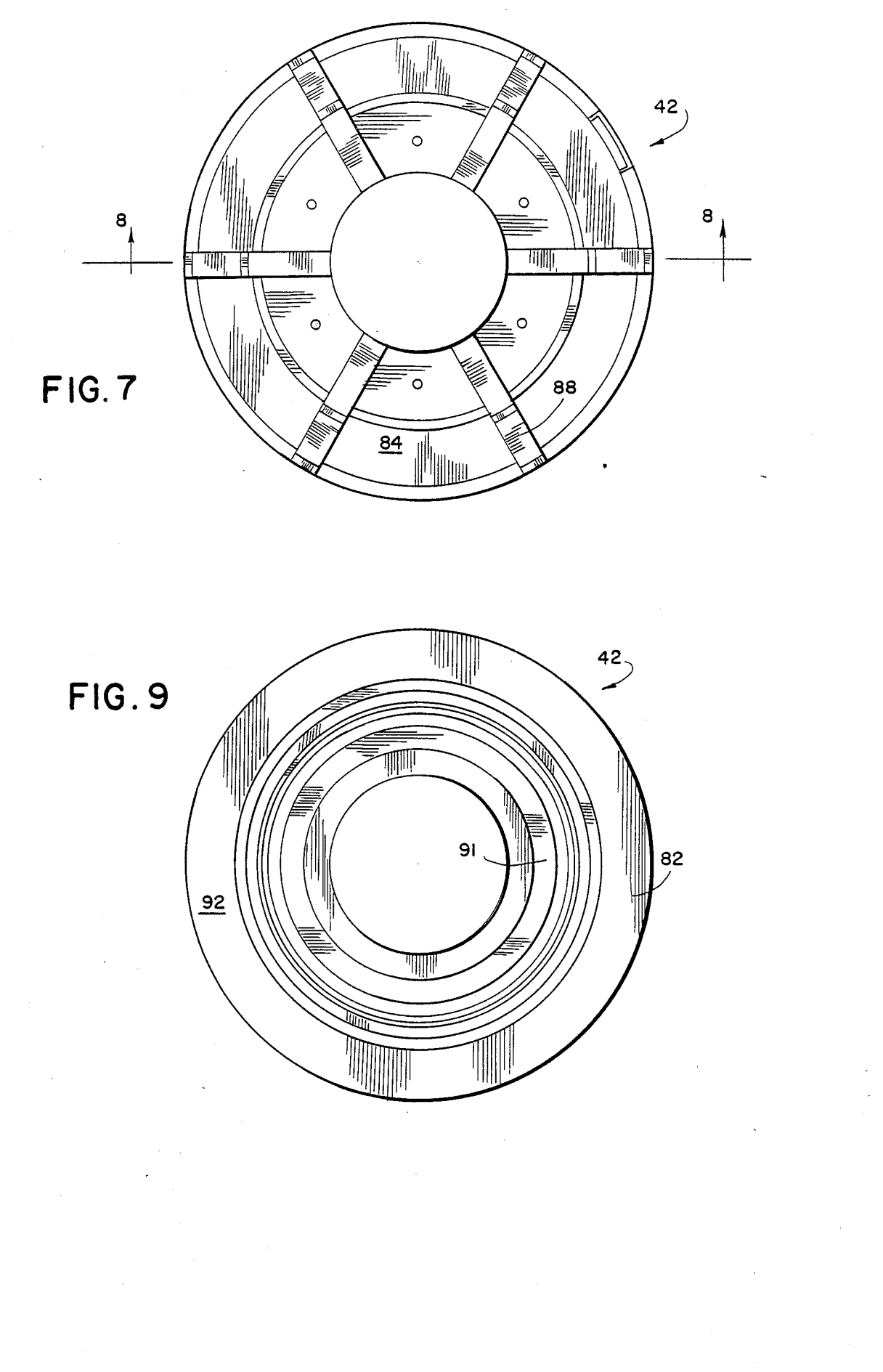

Referring to FIGS. 7 and 8, aligning spacer 42 is provided with a top surface 80 and a bottom surface 42 for placement against the flat mating surface 71 of raised annular section 49. The top surface 80 has a configuration which is substantially the same as the oppositely disposed bottom surface of inner section 57. The top surface 80 is provided with a plurality of spaced radially extending ribs 84 which also have a height H which mate with the bottom surface 76 of inner section 57 of bottom surface 45 and form a plurality of radially extending passages 88. The radially outer end 89 of spacer 42 is spaced from the outer shoulder 69 so as to provide an annular groove 75 for collection of the filtrate from collection grooves 68. The passages 88 connect annular groove 75 to central opening 38 allowing the filtrate to exit outlet 22. The annular outer surface of ribs 84 are provided with a ridge 94 which matingly engage the inner shoulder 67 of recess 65. This allows the spacer 42 to be self aligning with respect to the support disc 40 and provides a significant advantage in manufacturing spacer 42. The bottom surface 82 of spacer 42 is provided with annular supporting land 92 which lies in the same plane as the tops of ribs 60 and outer land 61 for supporting the annular inner periphery 79 of membrane 62. Preferably, membrane 62 is welded to land 92. Radially inward of land 92 and adjacent thereto on bottom surface 82 is raised section 83. Extending from raised section 83 is an annular projection 89 which is designed to be received in recess 53 of central portion 46 of an adjacent filter support assembly 36. Preferably, projection 89 is hermitcally sealed to disc 40. In the particular embodiment illustrated, projection 88 is welded to disc 40. Alternatively, the projection 88 may be used to mate with the annular boss 34 so as to assist in providing a seal between the filter means 32 and boss 34.

The spacers 42 is substantially smaller in size and not as complex in configuration in comparison to membrane support disc 40 and thus requires substantially less molding time to manufacture and a relatively simple mold configuration. Applicant, as a result of the configuration of the disc assembly has been able to use about 25 cm$^2$ per membrane (50 cm$^2$ per disc 40).

In the particular embodiment illustrated, only two filter support assemblies are shown, however, it is understood that as many filter support assemblies 36 may be provided as desired, for example, six (6) filter support assemblies 22 may be provided as illustrated in FIG. 9 which is discussed later on.

The upper most filter support assembly 34 is provided with a sealing cap 90 from preventing an unfiltered liquid from entering the bore 38 of filter means 32. As illustrated, the cap 90 is provided with an annular projection 97 for mating with the recess 53 of central portion 46 in support disc 40. Preferably, the cap 90 is welded to central portion 46.

Referring to FIG. 9, there is illustrated a modified embodiment of a filter assembly made in accordance with the present invention. Like numbers, as illustrated in FIGS. 1 through 8, indicate identical parts. The difference between this embodiment and the embodiment illustrated in FIG. 1-8 is that six (6) filter support assemblies 36 are provided instead of the two as previously discussed. In this particular embodiment, an annular spacer 100 is provided between the upper section 14 and lower section 16 of housing 12. The spacer is welded along its periphery to upper and lower sections 14, 16. It is of course obvious that the spacer may be made of any desired size so as to accommodate any desired number of filter support assemblies.

While the foregoing has been described in order to illustrate the present invention, various changes and modifications may be made without departing from the scope of the present invention. For example, but not by way of limitation, in the reformed form discs 40 are circular, however, they take other shapes other than circular, such as rectangular, square, etc.

The scope of the present invention being defined by the attached claims.

What is claimed is:

1. A filter assembly comprising a housing having a central filter chamber, said housing having an inlet for allowing entry of a liquid to be filtered, filter means disposed in said filter chamber for filtering of a liquid entering said chamber and an exhaust port for allowing exit for the liquid that has been filtered from said filter chamber, said filter means comprising at least one disc shaped filter assembly having a central opening for communication with said exhaust port, said disc shaped filter assembly comprising:

an upper annular integrally formed support disc having a top membrane support surface, a central axial opening communicating with said exhaust port, and a lower membrane support surface, said upper top membrane support surface and a lower membrane support surface each having a plurality of primary annular extending grooves for channeling a liquid and a plurality of main radially extending collection grooves for collecting said liquid from said primary grooves, said disc having at least one axial groove for connecting said collection grooves in said upper top membrane support surface with said collection grooves in said lower membranes support surface;

a first filter membrane disposed on said top surface covering said primary grooves and said connecting grooves, said membrane being sealingly secured to said top surface so that only liquid passing through said first membrane flows onto said primary and collection grooves;

a lower aligning integrally formed support disc for mating with the bottom surface of said upper annular support disc, said aligning support disc having an axial opening for communication with said axial opening of said upper annular support disc, said aligning support disc having a top surface facing said upper annular support disc, said top surface having a plurality of radially extending ribs which engage the bottom surface with said upper annular support disc and form a plurality of radially extending grooves which connect said collection grooves of said lower mombrane support surface with said axial opening of said upper angular support disc;

a second filter membrane disposed on said lower membrane support surface overlapping at least a portion of said lower aligning disc, said second filter membrane covering said primary and connecting grooves on said bottom surface and the space between said support disc and aligning disc and sealingly secured thereto so that only liquid which has passed through said first or second membrane passes to said axial opening;

means for aligning said lower aligning support disc with said upper annular support disc, said means comprising an annular shoulder in said lower surface of said upper annular support disc in said central portion and an annular projection on the upper surface of said upper aligning disc for mating with said annular shoulder; and means for allowing stacking a plurality of said disc assemblies comprising a recess in the upper surface of said upper top membranes surface and an annular projection on the upper surfaces of said aligning support disc, said projection being designed to engage said recess.

2. A filter assembly comprising a housing having a central filter chamber, said housing having an inlet for allowing entry of a liquid to be filtered, filter means disposed in said filter chamber for filtering of a liquid entering said chamber and an exhaust port for allowing exit for the liquid that has been filtered from said filter chamber, said filter means comprising at least one disc shaped filter assembly having a central opening for communication with said exhaust port, said disc shaped filter assembly comprising:

an upper annular support disc having a top membrane support surface, a central axial opening communicating with said exhaust port, and a lower membrane support surface, said upper top membrane support surface and a lower membrane support surface each having a plurality of annular primary grooves for channeling a liquid and a plurality of main radially extending collection grooves for collecting said liquid from said primary grooves, said disc having at least one axial groove for connecting said collection grooves in said upper top membrane support surface with said collection grooves in said lower membranes support surface;

a first filter membrane disposed on said top surface covering said primary grooves and said connecting grooves, said membrane being sealingly secured to said top surface so that only liquid passing through said first membrane flows onto said primary and collection grooves;

a lower aligning support disc for mating with the bottom surface of said upper annular support disc, said aligning support disc having an axial opening for communication with said axial opening of said upper annular support disc, said aligning support disc having a top surface facing said upper annular support disc, said top surface having a plurality of radially extending ribs which engage the bottom surface with said upper annular support disc and form a plurality of radially extending grooves which connect said collection grooves of said lower membrane support surface with said axial opening of said upper angular support disc; and a second filter membrane disposed on said lower membrane support surface overlapping at least a portion of said lower aligning disc, said second membrane covering said primary and connecting grooves on said bottom surface and the space between said support disc and aligning disc, and sealingly secured sheets so that only liquid which has passed through said first or second membrane passes to said axial opening.

3. A filter assembly according to claim 2 further comprising means for aligning said cover aligning support disc with said upper annular support disc.

4. A filter assembly according to claim 2 further comprising means for stacking a plurality of said disc assemblies.

5. A filter assembly according to claim 3 wherein said means for aligning said lower aligning support disc with said upper annular support disc comprises an annular shoulder in said lower surface of said upper annular support disc in said central portion and an annular projection on the upper surface of said upper aligning disc for mating with said annular shoulder.

6. A filter assembly according to claim 4 wherein said means for allowing stacking a plurality of said disc assemblies comprises a recess in the upper surface of said upper top membranes surface and an annular projection on the upper surfaces of said aligning support disc, said projection being designed to engage said recess.

7. A filter assembly according to claim 2 wherein the inner and outer peripheries of said first and secured filter membranes are second to said upper annular support disc and aligning disc by welding of said membranes.

8. A filter assembly according to claim 2 wherein a plurality of disc shaped filter assemblies are provided in axial alignment, each of said assemblies being a configuration such that the bottom and top surfaces of each disc are spaced apart from the adjacent top or bottom surface of the adjacent assembly so as to allow a liquid to pass easily therebetween.

* * * * *